(12) United States Patent
Wakabayashi et al.

(10) Patent No.: US 12,197,096 B2
(45) Date of Patent: Jan. 14, 2025

(54) DISPLAY DEVICE

(71) Applicant: Japan Display Inc., Tokyo (JP)

(72) Inventors: Yuta Wakabayashi, Tokyo (JP);
Yasuyuki Hanazawa, Tokyo (JP);
Michikazu Noguchi, Tokyo (JP); Ryou Shimmen, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/434,836

(22) Filed: Feb. 7, 2024

(65) Prior Publication Data

US 2024/0288740 A1 Aug. 29, 2024

(30) Foreign Application Priority Data

Feb. 28, 2023 (JP) .................. 2023-029612

(51) Int. Cl.
| | | |
|---|---|---|
| *G02F 1/137* | (2006.01) | |
| *G02F 1/1333* | (2006.01) | |
| *G02F 1/1334* | (2006.01) | |
| *G02F 1/1339* | (2006.01) | |
| *G02F 1/1343* | (2006.01) | |
| *G02F 1/1362* | (2006.01) | |

(52) U.S. Cl.
CPC .... *G02F 1/13756* (2021.01); *G02F 1/133385* (2013.01); *G02F 1/1334* (2013.01); *G02F 1/1339* (2013.01); *G02F 1/134309* (2013.01); *G02F 1/1362* (2013.01); *G02F 2202/28* (2013.01)

(58) Field of Classification Search
CPC ........... G02F 1/13756; G02F 1/133385; G02F 1/1334; G02F 1/1339; G02F 1/134309; G02F 1/1362
See application file for complete search history.

(56) References Cited

U.S. PATENT DOCUMENTS

| | | | |
|---|---|---|---|
| 2010/0026662 A1* | 2/2010 | Oohira | G06F 3/0443 349/12 |
| 2022/0390792 A1* | 12/2022 | Ichihara | G02F 1/133385 |
| 2022/0390803 A1* | 12/2022 | Ichihara | G02F 1/136286 |

FOREIGN PATENT DOCUMENTS

| | | |
|---|---|---|
| JP | 2022-186251 A | 12/2022 |
| JP | 2022-186252 A | 12/2022 |

* cited by examiner

*Primary Examiner* — Dung T Nguyen
*Assistant Examiner* — David Y Chung
(74) *Attorney, Agent, or Firm* — XSENSUS LLP

(57) ABSTRACT

According to one embodiment, a display device includes an array substrate, a first cover member and a first adhesive layer. The array substrate includes first and second main surfaces and a first side surface. The first cover member includes third and fourth main surfaces and a second side surface. The first adhesive layer attaches the first and third main surfaces. The array substrate further includes a display area and a mounting area between the first side surface and the display area. The first cover member includes a protruding portion which protrudes relative to the first side surface.

16 Claims, 4 Drawing Sheets

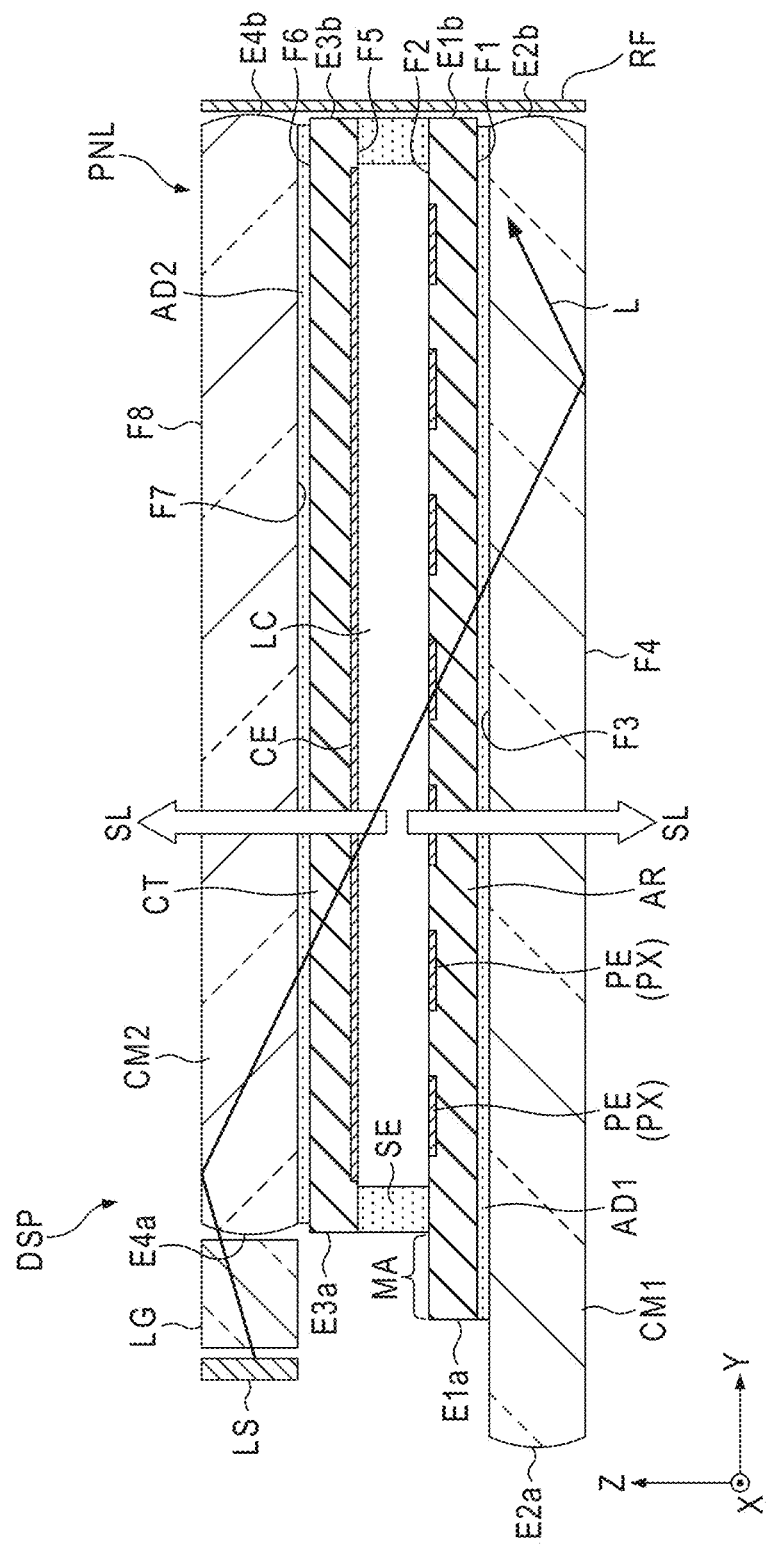
F I G. 2

DISPLAY DEVICE

CROSS-REFERENCE TO RELATED APPLICATIONS

This application is based upon and claims the benefit of priority from Japanese Patent Application No. 2023-029612, filed Feb. 28, 2023, the entire contents of which are incorporated herein by reference.

FIELD

Embodiments described herein relate generally to a display device.

BACKGROUND

As examples of display devices, liquid crystal display devices and organic electroluminescent (EL) display devices are known. In recent years, transparent display devices which comprise a polymer dispersed liquid crystal layer which can switch between a transparent state for transmitting light and a scattered state for scattering light based on the application of voltage have been also suggested.

These display devices comprise an array substrate in which a plurality of pixel electrodes and a drive circuit are formed. In addition, a cover member such as a cover glass is provided on both sides of the array substrate.

Normally, a mounting area for mounting an integrated circuit and a flexible printed circuit is formed along one of the sides of the array substrate. A light source which emits light used for display, a light guide such as a lens on which light from the light source is made incident and a frame which holds these light source and light guide may be provided near the mounting area in some cases.

Thus, various elements are provided around the mounting area. For this reason, the structure of the vicinity of the mounting area requires strength for stably supporting each element.

BRIEF DESCRIPTION OF THE DRAWINGS

FIG. 2 is a schematic cross-sectional view of the display device.

DETAILED DESCRIPTION

Figure 1:
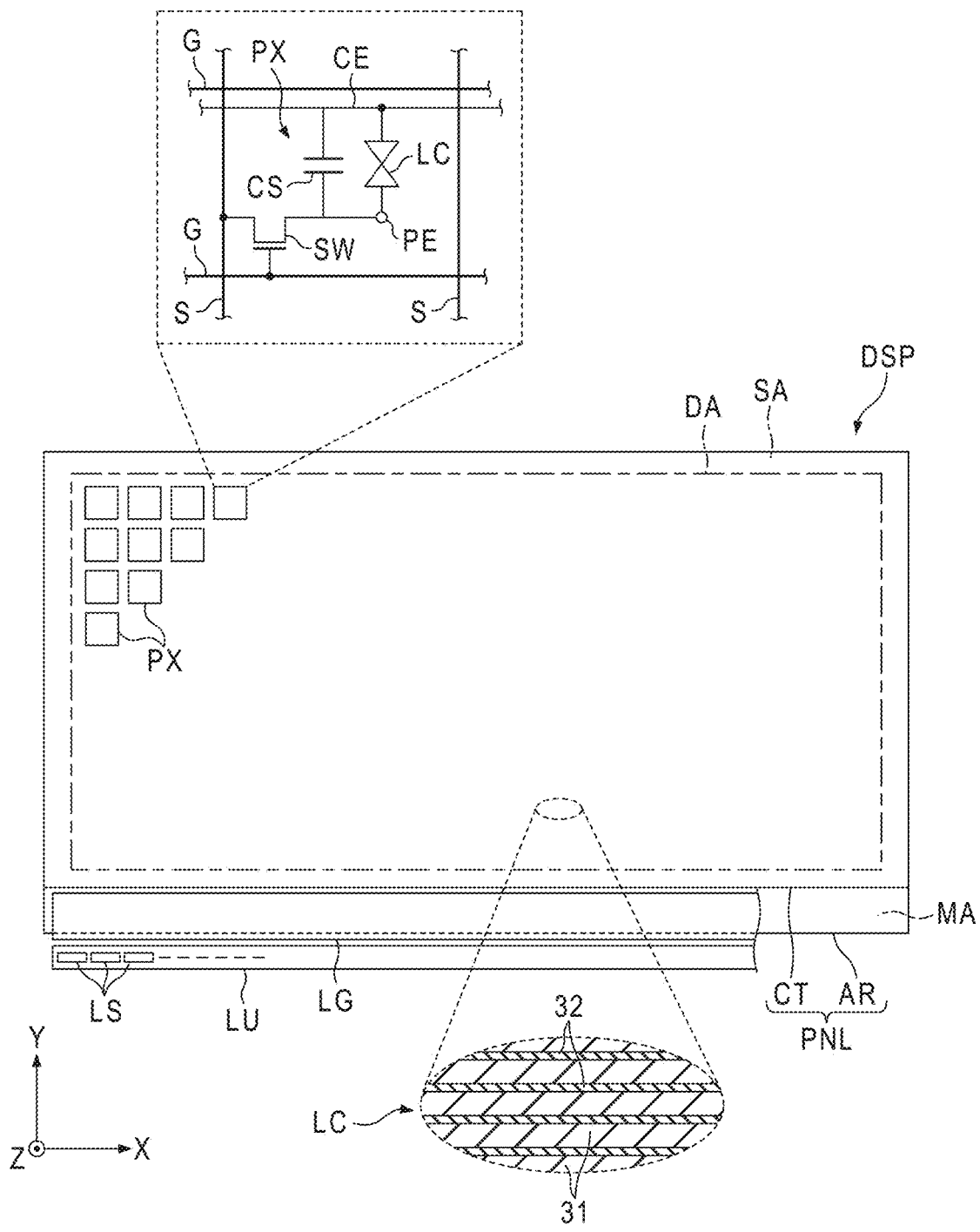
FIG. 1 is a diagram showing a configuration example of a display device according to a first embodiment.

In general, according to one embodiment, a display device comprises an array substrate, a first cover member and a first adhesive layer. The array substrate comprises a first main surface, a second main surface on a side opposite to the first main surface, and a first side surface connecting the first main surface and the second main surface to each other. The first cover member comprises a third main surface facing the first main surface, a fourth main surface on a side opposite to the third main surface, and a second side surface connecting the third main surface and the fourth main surface to each other. The first adhesive layer attaches the first main surface and the third main surface to each other. The array substrate further comprises a display area including a plurality of pixel electrodes, and a mounting area located between the first side surface and the display area as seen in plan view and including a terminal to which a drive signal of the array substrate is input. The first cover member comprises a protruding portion which protrudes relative to the first side surface.

This configuration can provide a display device in which the strength of the vicinity of a mounting area can be increased.

Embodiments will be described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the X-axis is referred to as a first direction X. A direction parallel to the Y-axis is referred to as a second direction Y. A direction parallel to the Z-axis is referred to as a third direction Z. When various elements are viewed parallel to the third direction Z, the appearance is defined as a plan view.

As an example of display devices, the embodiment discloses a liquid crystal display device (transparent display device) to which polymer dispersed liquid crystals are applied and which has high light translucency. It should be noted that the configuration disclosed in the embodiment, especially the configuration related to various elements provided in a mounting area and its vicinity, can be also applied to other types of display devices.

FIG. 1 is a diagram showing a configuration example of a display device DSP according to a first embodiment. The display device DSP comprises a display panel PNL, a light source unit LU and a light guide LG. In FIG. 1, the light source unit LU and the light guide LG are partly omitted by adding a break line.

The display panel PNL comprises an array substrate AR and a counter-substrate CT stacked in a third direction Z. In FIG. 1, the shape of each of the array substrate AR and the counter-substrate CT in plan view is a rectangular shape which is long in a first direction X. It should be noted that the shape of the array substrate AR or the counter-substrate CT is not limited to this example.

The width of the array substrate AR in a second direction Y is greater than that of the counter-substrate CT in the second direction Y. By this configuration, the array substrate AR comprises a mounting area MA which does not overlap the counter-substrate CT. In the mounting area MA, integrated circuits and flexible printed circuits as described later are mounted.

The display panel PNL comprises a display area DA which displays an image, and a surrounding area SA which surrounds the display area DA and has a frame shape. Both the display area DA and the surrounding area SA are formed in a portion in which the array substrate AR overlaps the counter-substrate CT. The display area DA comprises a plurality of pixels PX arrayed in matrix in the first direction X and the second direction Y.

The display panel PNL further comprises a liquid crystal layer LC which is sealed in between the array substrate AR and the counter-substrate CT. As schematically shown in the enlarged view on the lower side of FIG. 1, the liquid crystal layer LC consists polymer dispersed liquid crystals containing polymers 31 and liquid crystal molecules 32. For example, the polymers 31 are liquid crystalline polymers. The polymers 31 are formed in a streaky shape extending in the first direction X and are arranged in the second direction Y. The liquid crystal molecules 32 are dispersed in the gaps of the polymers 31, and are aligned such that the long axes are parallel to the first direction X.

Each of the polymers 31 and the liquid crystal molecules 32 has optical anisotropy or refractive anisotropy. The responsiveness of the polymers 31 for an electric field is lower than that of the liquid crystal molecules 32 for an electric field. For example, the alignment direction of the polymers 31 does not substantially change regardless of the presence or absence of an electric field. To the contrary, the alignment direction of the liquid crystal molecules 32 changes based on the voltage applied to the liquid crystal layer LC.

In a state where no voltage is applied to the liquid crystal layer LC, the optical axes of the polymers 31 are parallel to those of the liquid crystal molecule 32, and the incident light on the liquid crystal layer LC is not substantially scattered inside the liquid crystal layer LC and passes through the liquid crystal layer LC (transparent state).

In a state where voltage is applied to the liquid crystal layer LC, the optical axes of the polymers 31 intersect with those of the liquid crystal molecules 32, and the incident light on the liquid crystal layer LC is scattered inside the liquid crystal layer LC (scattered state).

As shown in the enlarged view on the upper side of FIG. 1, a plurality of scanning lines G and a plurality of signal lines S are provided in the display area DA. The scanning lines G extend in the first direction X and are arranged in the second direction Y. The signal lines S extend in the second direction Y and are arranged in the first direction X.

Each pixel PX comprises a switching element SW, a pixel electrode PE, a common electrode CE and capacitance CS. The switching element SW consists of, for example, a thin-film transistor (TFT), and is electrically connected to the scanning line G and the signal line S. The pixel electrode PE is electrically connected to the switching element SW.

The liquid crystal layer LC (particularly, the liquid crystal molecules 32) is driven by the electric field generated between the pixel electrode PE and the common electrode CE. For example, the capacitance CS is formed between an electrode having the same potential as the common electrode CE and an electrode having the same potential as the pixel electrode PE.

The light source unit LU and the light guide LG are provided along the mounting area MA. The light source unit LU comprises a plurality of light sources LS arranged in the first direction X. Each light source LS emits light to the light guide LG. For the light guide LG, for example, a lens such as a prism lens can be used.

For example, the light sources LS include a light emitting element which emits red light, a light emitting element which emits green light and a light emitting element which emits blue light. These light emitting elements may be arranged in the first direction X or may be stacked in the third direction Z. For the light emitting elements, light emitting diodes (LEDs) can be used.

FIG. 2 is a schematic cross-sectional view of the display device DSP. In this figure, the structure of the display panel PNL, etc., is schematically shown, and the elements of the scanning lines G, the signal lines S, the switching elements SW, etc., are omitted.

The array substrate AR and the counter-substrate CT are attached to each other by a sealing material SE. The sealing material SE has a shape which surrounds the display area DA as seen in plan view. The space surrounded by the sealing material SE is filled with the liquid crystal layer LC.

The array substrate AR comprises the pixel electrodes PE described above. The counter-substrate CT comprises the common electrode CE described above. The pixel electrodes PE face the common electrode CE via the liquid crystal layer LC. The pixel electrodes PE and the common electrode CE are formed on insulating substrates provided in the array substrate AR and the counter-substrate CE, respectively. These insulating substrates are formed of, for example, glass. However, the insulating substrates may be formed of plastic. For example, the pixel electrodes PE and the common electrode CE are covered with alignment films formed in the array substrate AR and the counter-substrate CT, respectively. It should be noted that the layout of the pixel electrodes PE or the common electrode CE is not limited to this example. As another example, the array substrate AR may comprise both the pixel electrodes PE and the common electrode CE.

The display panel PNL further comprises a first cover member CM1 and a second cover member CM2. Both of these cover members CM1 and MC2 are transparent, and are, for example, cover glasses formed of glass. As another example, the cover members CM1 and CM2 may be formed of plastic. The cover members CM1 and CM2 are sufficiently thicker than the array substrate AR and the counter-substrate CT. For example, the cover members CM1 and CM2 have thicknesses which are greater than or equal to twice those of the array substrate AR and the counter-substrate CT, respectively.

The array substrate AR comprises a main surface (first main surface) F1, a main surface (second main surface) F2 on a side opposite to the main surface F1, and side surfaces (first side surfaces) E1a and E1b connecting the main surfaces F1 and F2 to each other. The first cover member CM1 comprises a main surface (third main surface) F3 facing the main surface F1, a main surface (fourth main surface) F4 on a side opposite to the main surface F3, and side surfaces (second side surfaces) E2a and E2b connecting the main surfaces F3 and F4 to each other. The main surfaces F1 and F3 are attached to each other by a transparent first adhesive layer AD1. For the first adhesive layer AD1, for example, an optical clear adhesive (OCA) can be used.

The counter-substrate CT comprises a main surface (fifth main surface) F5 facing the main surface F2 via the liquid crystal layer LC, a main surface (sixth main surface) F6 on a side opposite to the main surface F5, and side surfaces (third side surfaces) E3a and E3b connecting the main surfaces F5 and F6 to each other. The second cover member CM2 comprises a main surface (seventh main surface) F7 facing the main surface F6, a main surface (eighth main surface) F8 on a side opposite to the main surface F7, and side surfaces (fourth side surfaces) E4a and E4b connecting the main surfaces F7 and F8 to each other. The main surfaces F6 and F7 are attached to each other by a transparent second adhesive layer AD2. For the second adhesive layer AD2, an OCA can be used in a manner similar to that of the first adhesive layer AD1.

All of the side surfaces E1a, E2a, E3a and E4a are located on the light source LS side (incident side). All of the side surfaces E1b, E2b, E3b and E4b are located on a side opposite to the light source LS (a side opposite to the incident side). The mounting area MA is formed in a portion which protrudes relative to the side surface E3a in the array substrate AR.

In the example of FIG. 2, the sectional shape of each of the side surfaces E2a, E4a, E2b and E4b is a projecting arcuate shape. The side surfaces E2a, E4a, E2b and E4b extend in the first direction X, having this sectional shape. The configuration is not limited to this example. At least one of the side surfaces E2a, E4a, E2b and E4b may be a flat surface parallel to the first direction X and the third direction Z.

In the example of FIG. 2, a reflective material RF is provided near the side surfaces E1b, E2b, E3b and E4b. The reflective material RF is, for example, a reflective tape attached to the side surfaces E1b, E2b, E3b and E4b. As another example, the reflective material RF may be a reflective film formed in the side surfaces E1b, E2b, E3b and E4b.

The light source LS faces the side surface E4a. The light guide LG is provided between the side surface E4a and the light source LS. FIG. 2 shows an example of the path of light L emitted from the light source LS. Light L emitted from the light source LS passes through the light guide LG and enters the side surface E4a. This light L proceeds to the side opposite to the incident side while repeating total reflection between the main surface F8 and the main surface F4. Light L which reached the side surfaces E1b, E2b, E3b and E4b is reflected by the reflective material RF and proceeds to the incident side while repeating total reflection between the main surface F8 and the main surface F4.

Near a pixel PX in a transparent state, light L is not substantially scattered in the liquid crystal layer LC. Thus, light L does not substantially leak out of the cover member CM1 or CM2.

To the contrary, near a pixel PX in a scattered state, light L is scattered in the liquid crystal layer LC. This scattered light SL is emitted from the cover members CM1 and CM2 and is visually recognized as a display image by the user. The gradation expression of the degree of scattering (luminance) can be realized by defining the voltage to be applied to the pixel electrodes PE in stages in a predetermined range.

It should be noted that, near a pixel PX in a transparent state, the external light which enters the cover member CM1 or CM2 is not substantially scattered and passes through the liquid crystal layer LC. Thus, when the display device DSP is viewed from the first cover member CM1 side, the background on the second cover member CM2 side can be visually recognized. When the display device DSP is viewed from the second cover member CM2 side, the background on the first cover member CM1 side can be visually recognized.

For example, as a system for displaying an image by the display device DSP, the following field sequential system could be used. The field sequential system repeats a first subframe in which a red image is displayed by lighting up the red light emitting elements of the light sources LS, a second subframe in which a green image is displayed by lighting up the green light emitting elements and a third subframe in which a blue image is displayed by lighting up the blue light emitting elements.

Figure 3:
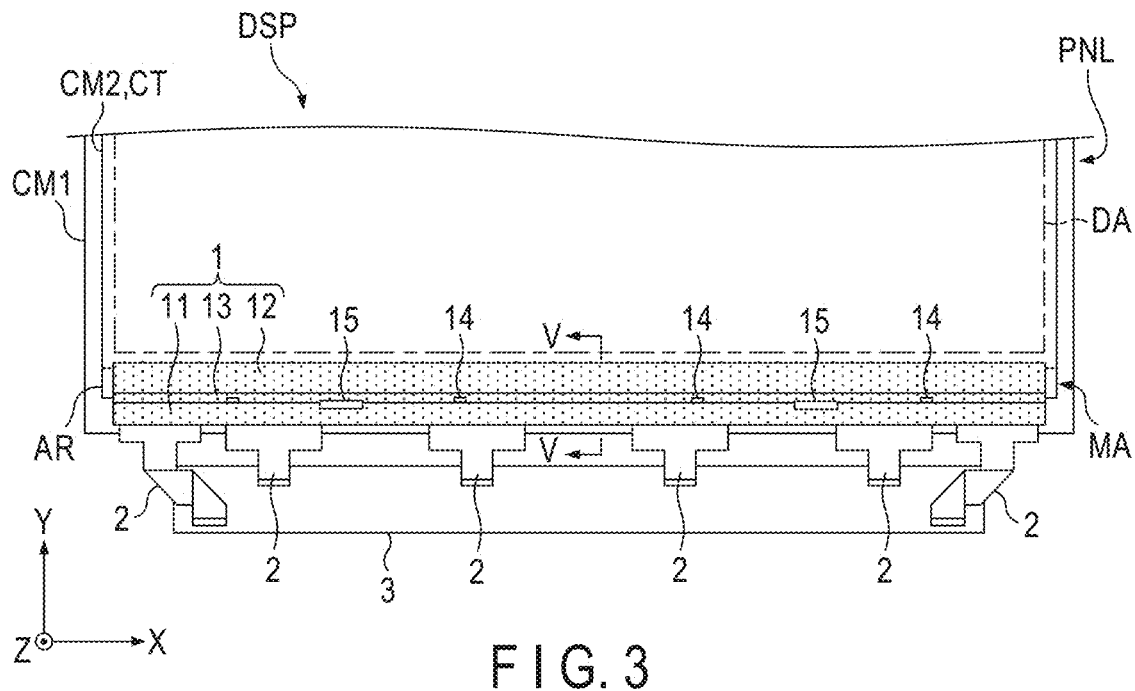
FIG. 3 is a schematic plan view showing an example of a configuration which could be applied to the vicinity of a mounting area.

FIG. 3 is a schematic plan view showing an example of a configuration which could be applied to the vicinity of the mounting area MA. The display device DSP comprises a frame 1 which holds the light source unit LU and the light guide LG. The frame 1 has a shape which is long in the first direction X, and covers the mounting area MA.

For example, the frame 1 comprises a first portion 11, a second portion 12 and a rib 13 located between the first portion 11 and the second portion 12. The first portion 11 is located on the lower side of the figure relative to the rib 13 (in other words, a side opposite to the display area DA). The second portion 12 is located between the rib 13 and the display area DA. In the example of FIG. 3, the frame 1 further comprises a plurality of apertures 14 and a plurality of apertures 15 which are longer than the apertures 14 in the first direction X.

In the example of FIG. 3, the planar shape of the counter-substrate CT is coincident with the planar shape of the second cover member CM2. The first cover member CM1 has a width which is greater than that of each of the array substrate AR, the counter-substrate CT and the second cover member CM2 in the first direction X. By this configuration, the both end portions of the first cover member CM1 in the first direction X protrude relative to the array substrate AR, the counter-substrate CT and the second cover member CM2. The both end portions of the first cover member CM1 can be used to, for example, attach a frame which protects the both lateral sides of the display panel PNL in the first direction X.

An end of each of a plurality of flexible printed circuits 2 is connected to the mounting area MA. The other ends of these flexible printed circuits 2 are connected to, for example, a circuit board 3 which is a rigid printed circuit board (PCB).

Figure 4:
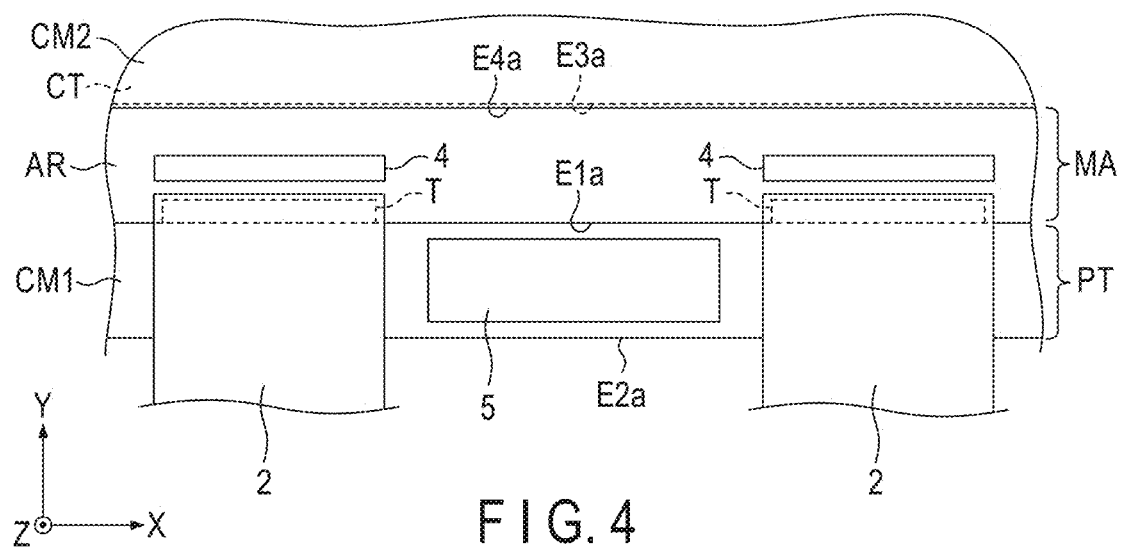
FIG. 4 is a schematic plan view showing an enlarged view of the vicinity of the mounting area.

FIG. 4 is a schematic plan view showing the vicinity of the mounting area MA of the display panel PNL from which the frame 1, the light source unit LU and the light guide LG are removed. A plurality of terminals T are provided in the mounting area MA. The flexible printed circuits 2 are connected to the terminals T via a conductive adhesive material. Further, a plurality of integrated circuits 4 are mounted in the mounting area MA. In the example of FIG. 4, each integrated circuit 4 is adjacent to a corresponding terminal T in the second direction Y.

The drive signals of the array substrate AR are input to the terminals T via the circuit board 3 and the flexible printed circuits 2. For example, each of the integrated circuits 4 includes a driver which supplies a signal to the scanning line G and signal line S shown in FIG. 1 based on the drive signal input to the terminal T.

The first cover member CM1 comprises a protruding portion PT which protrudes from the side surface E1a of the array substrate AR. At least one adhesive member 5 is provided in the protruding portion PT. For example, each adhesive member 5 is provided between two flexible printed circuits 2 which are adjacent to each other.

Figure 5:
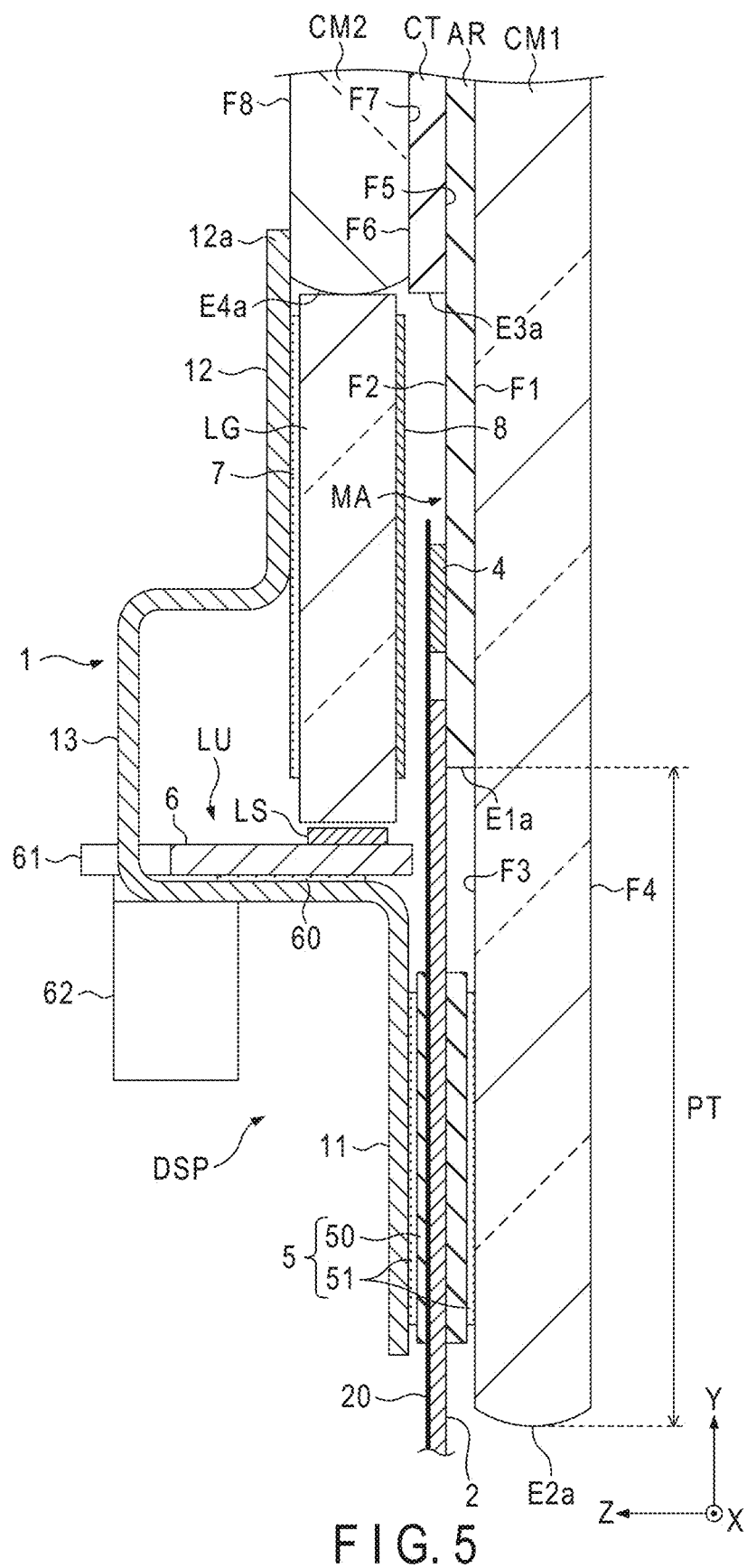
FIG. 5 is a schematic cross-sectional view of the display device along the V-V line of FIG. 3.

FIG. 5 is a schematic cross-sectional view of the display device DSP along the V-V line of FIG. 3. In FIG. 5, the illustration of the adhesive layer AD1 or AD2, the sealing material SE, the liquid crystal layer LC, etc., is omitted.

As is clear from the explanation so far, the array substrate AR protrudes relative to the side surface E3a of the counter-substrate CT, and the first cover member CM1 protrudes relative to the side surface E1a of the array substrate AR. The first cover member CM1 protrudes relative to the side surface E4a of the second cover member CM2. In the example of FIG. 5, the position of the side surface E3a of the counter-substrate CT is aligned with the position of the side surface E4a of the second cover member CM2. The mounting area MA is formed in a portion which protrudes relative to the side surfaces E3a and E4a in the array substrate AR.

A heat radiation sheet 20 may be attached to the flexible printed circuit 2 and integrated circuit 4 mounted in the mounting area MA. By this configuration, the increase in the temperature of the integrated circuit IC by the heat generated at the time of display driving can be prevented.

For example, the first portion 11, second portion 12 and rib 13 of the frame 1 are integrally formed by a metal material. Each of the first portion 11 and the second portion 12 has the shape of a flat plate parallel to the first direction X and the second direction Y.

In the example of FIG. 5, the position of the first portion 11 is misaligned with the position of the second portion 12 in the third direction Z. Specifically, the distance between the first portion 11 and the first cover member CM1 is shorter than the distance between the second portion 12 and the first cover member CM1. The rib 13 protrudes from the first portion 11 and the second portion 12 in the third direction Z. The rib 13 is provided at a position overlapping the side surface E1a of the array substrate AR in the third direction Z.

The first portion 11 is attached to the main surface F3 of the protruding portion PT by the adhesive member 5. The adhesive member 5 comprises, for example, a base 50 which is a heat radiation sheet, and an adhesive layer 51 provided on each surface of the base 50. The base 50 also functions as a spacer which forms a gap for letting the flexible printed circuit 2 pass through between the main surface F3 and the first portion 11 in the protruding portion PT.

The distal end portion 12a of the second portion 12 is in contact with the main surface F8 of the second cover member CM2. For example, the distal end portion 12a does not adhere to the main surface F8. As another example, the distal end portion 12a may adhere to at least part of the main surface F8 by an adhesive layer.

The light source unit LU comprises a light source substrate 6 in which the light source LS is mounted. The light source substrate 6 is secured to the frame 1. The securing method is not particularly limited. In the example of FIG. 5, the light source substrate 6 is attached to the inner surface of the rib 13 by an adhesive layer 60.

For example, the light source substrate 6 comprises a plurality of protrusions 61 inserted into the apertures 14 shown in FIG. 3. A connector 62 is connected to the light source substrate 6 through the aperture 15 shown in FIG. 3. A signal for driving the light source LS is input via this connector 62.

The light guide LG is provided in the space surrounded by the display panel PNL and the frame 1. The light guide LG is located between the frame 1 and the mounting area MA in the third direction Z. For example, the light guide LG is attached to the second portion 12 by an adhesive layer 7 having light reflectivity. A reflective sheet 8 is attached to, of the light guide LG, the surface facing the mounting area MA. These adhesive layer 7 and reflective sheet 8 prevent the emission of light from the light guide LG.

Thus, in the display device DSP of the embodiment, the first cover member CM1 comprises the protruding portion PT which protrudes relative to the side surface E1a of the array substrate AR. The strength of the vicinity of the mounting area MA can be increased by using this protruding portion PT.

If the first cover member CM1 is retracted relative to the side surface E1a of the array substrate AR, a complex structure for attaching the frame 1 to the display panel PNL is needed. As an example of the structure, a plate material which partly protrudes from the side surface E1a may be attached to the main surface F1 of the array substrate AR, and the frame 1 may be attached to the protruding portion of the plate material. However, in this case, a load is easily applied to the thin array substrate AR. In addition, if operation for adhesion of each member is performed with weak strength to prevent a load to the array substrate AR at the time of assembling the display device DSP, the adhesive force of each member could be insufficient.

To the contrary, in the embodiment, the frame 1 which holds the light source unit LU and the light guide LG is attached to the protruding portion PT of the first cover member CM1. In this case, the strength of the structure of attaching the frame 1 can be increased since the first cover member CM1 is thicker than the array substrate AR, etc. Further, at the time of assembling the display device DSP, each member can be attached with strong force, and good adhesion strength can be realized.

Near the light source LS in the display area DA, color unevenness such as a rainbow may be caused. As a result of analysis of the inventor and the like, it was found that the color unevenness can be reduced by aligning the side surface E3a of the counter-substrate CT with the side surface E4a of the second cover member CM2 as in the case of the embodiment. Thus, an effect of improving the display quality by preventing the color unevenness described above can be also obtained from the configuration of the embodiment.

All of the display devices that can be implemented by a person of ordinary skill in the art through arbitrary design changes to the display device described above as the embodiments of the present invention come within the scope of the present invention as long as they are in keeping with the spirit of the present invention.

Various modification examples which may be conceived by a person of ordinary skill in the art in the scope of the idea of the present invention will also fall within the scope of the invention. For example, even if a person of ordinary skill in the art arbitrarily modifies the above embodiments by adding or deleting a structural element or changing the design of a structural element, or by adding or omitting a step or changing the condition of a step, all of the modifications fall within the scope of the present invention as long as they are in keeping with the spirit of the invention.

Further, other effects which may be obtained from each embodiment and are self-explanatory from the descriptions of the specification or can be arbitrarily conceived by a person of ordinary skill in the art are considered as the effects of the present invention as a matter of course.

What is claimed is:
1. A display device comprising:
an array substrate comprising a first main surface, a second main surface on a side opposite to the first main surface, and a first side surface connecting the first main surface and the second main surface to each other;
a transparent first cover member comprising a third main surface facing the first main surface, a fourth main surface on a side opposite to the third main surface, and a second side surface connecting the third main surface and the fourth main surface to each other;
a first adhesive layer which attaches the first main surface and the third main surface to each other;
a counter-substrate comprising a fifth main surface facing the second main surface, a sixth main surface on a side opposite to the fifth main surface, and a third side surface connecting the fifth main surface and the sixth main surface to each other;
a sealing material which attaches the array substrate and the counter-substrate to each other;
a liquid crystal layer which is sealed in between the array substrate and the counter-substrate by the sealing material;
a transparent second cover member comprising a seventh main surface facing the sixth main surface, an eighth main surface on a side opposite to the seventh main surface, and a fourth side surface connecting the seventh main surface and the eighth main surface to each other;
a second adhesive layer which attaches the sixth main surface and the seventh main surface to each other;
a light source facing the fourth side surface;
a light guide provided between the fourth side surface and the light source,
a frame which holds the light source and the light guide; and
an adhesive member which attaches the frame to the third main surface,
wherein
the array substrate comprises a display area including a plurality of pixel electrodes, and a mounting area located between the first side surface and the display area as seen in plan view and including a terminal to which a drive signal of the array substrate is input,
the first cover member comprises a protruding portion which protrudes relative to the first side surface,
the mounting area is formed in a portion which protrudes relative to the third side surface in the array substrate, and
the adhesive member attaches the frame to the third main surface in the protruding portion.

2. The display device of claim 1, wherein
the first cover member protrudes relative to the fourth side surface.

3. The display device of claim 1, wherein
a position of the third side surface is aligned with a position of the fourth side surface.

4. The display device of claim 1, wherein the liquid crystal layer is a polymer dispersed liquid crystal layer which can switch between a transparent state for transmitting light and a scattered state for scattering light from the light source based on application of voltage.

5. The display device of claim 1, wherein
the adhesive member includes a base, and a pair of adhesive layers provided on both sides of the base, respectively.

6. The display device of claim 5, wherein
the base is a heat radiation sheet.

7. The display device of claim 1, wherein
the frame is in contact with the eighth main surface.

8. The display device of claim 1, wherein
the light guide is located between the frame and the mounting area.

9. The display device of claim 8, further comprising a flexible printed circuit connected to the terminal, wherein
the flexible printed circuit partly passes through a gap formed between the frame and the protruding portion.

10. The display device of claim 9, wherein
the gap is formed by the adhesive member.

11. The display device of claim 9, further comprising:
an integrated circuit provided in the mounting area; and
a heat radiation sheet attached to the flexible printed circuit and the integrated circuit.

12. The display device of claim 1, comprising a plurality of flexible printed circuits connected to the mounting area, wherein
the adhesive member is located between two adjacent flexible printed circuits of the plurality of flexible printed circuits.

13. The display device of claim 1, wherein
the frame comprises a first portion attached to the third main surface by the adhesive member, and a second portion which is in contact with the eighth main surface.

14. The display device of claim 13, wherein
the frame further comprises a rib located between the first portion and the second portion.

15. The display device of claim 14, further comprising a light source substrate in which the light source is mounted, wherein
the light source substrate is attached to the rib.

16. The display device of claim 1, wherein
a background on the second cover member side can be visually recognized from the first cover member side, and a background on the first cover member side can be visually recognized from the second cover member side.

* * * * *